United States Patent
Goldman

(10) Patent No.: US 8,694,988 B2
(45) Date of Patent: Apr. 8, 2014

(54) RUNTIME EXTENSIONS

(75) Inventor: Oliver Goldman, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 373 days.

(21) Appl. No.: 12/910,773

(22) Filed: Oct. 22, 2010

(65) Prior Publication Data

US 2012/0102485 A1    Apr. 26, 2012

(51) Int. Cl.
  *G06F 9/445* (2006.01)
  *G06F 9/44* (2006.01)

(52) U.S. Cl.
  USPC .......................... 717/174; 717/176; 717/162

(58) Field of Classification Search
  None
  See application file for complete search history.

(56) References Cited

U.S. PATENT DOCUMENTS

| | | | |
|---|---|---|---|
| 6,125,388 A | 9/2000 | Reisman | |
| 6,557,054 B2 | 4/2003 | Reisman | |
| 6,687,745 B1 | 2/2004 | Franco et al. | |
| 6,687,902 B1 | 2/2004 | Curtis et al. | |
| 7,165,241 B2* | 1/2007 | Manda et al. | 717/124 |
| 8,032,861 B2* | 10/2011 | Fernando et al. | 717/120 |
| 8,171,470 B2* | 5/2012 | Goldman et al. | 717/174 |
| 8,191,060 B2* | 5/2012 | Malasky et al. | 717/175 |
| 8,352,967 B2* | 1/2013 | Labour et al. | 719/328 |
| 8,448,161 B2* | 5/2013 | Goldman | 717/170 |
| 8,464,249 B1* | 6/2013 | Goldman et al. | 717/176 |
| 8,554,732 B2* | 10/2013 | Clark et al. | 707/638 |
| 2001/0052121 A1 | 12/2001 | Masuda et al. | |
| 2003/0037328 A1 | 2/2003 | Cicciarelli et al. | |
| 2003/0145317 A1 | 7/2003 | Chamberlain | |
| 2004/0088377 A1 | 5/2004 | Henriquez | |
| 2004/0139430 A1 | 7/2004 | Eatough et al. | |
| 2004/0194082 A1 | 9/2004 | Purkeypile et al. | |
| 2005/0155027 A1 | 7/2005 | Wei | |
| 2006/0026591 A1* | 2/2006 | Backhouse et al. | 717/177 |
| 2006/0230396 A1* | 10/2006 | Martinez et al. | 717/173 |
| 2006/0242655 A1* | 10/2006 | Fernando et al. | 719/332 |
| 2006/0277537 A1* | 12/2006 | Chan et al. | 717/168 |
| 2007/0277109 A1* | 11/2007 | Chen et al. | 715/733 |
| 2008/0028390 A1 | 1/2008 | Fors et al. | |

(Continued)

FOREIGN PATENT DOCUMENTS

CN            102455912        5/2012

OTHER PUBLICATIONS

Adobe, Developing Adobe® AIR™ 1.5 Applications with HTML and Ajax, copyright 2009.*
Zombie processes workaround Adobe community, Mar. 22, 2009.*

(Continued)

*Primary Examiner* — Insun Kang
(74) *Attorney, Agent, or Firm* — Wolfe-SBMC

(57) ABSTRACT

Methods, systems, and apparatus, including computer programs encoded on a computer storage medium, provide a technique for supporting native program code extensions for managed code environments. In one aspect, a method includes the actions of: obtaining a package of information defining an extension to an application program interface of a runtime, the package of information including native program code and descriptors that identify different computing platforms supported by the extension; obtaining a declaration of a target computing platform for an application program that employs the extension; comparing the declaration of the target computing platform for the application program with the descriptors that identify the different computing platforms supported by the extension; if the target computing platform is supported by the extension, generating an installable package for the application program; and if the target computing platform is not supported by the extension, providing a notification corresponding thereto.

22 Claims, 9 Drawing Sheets

(56) References Cited

U.S. PATENT DOCUMENTS

| | | | |
|---|---|---|---|
| 2008/0127169 A1* | 5/2008 | Malasky et al. | 717/174 |
| 2008/0127170 A1 | 5/2008 | Goldman et al. | |
| 2009/0037835 A1* | 2/2009 | Goldman | 715/771 |
| 2009/0106731 A1* | 4/2009 | Coulthard et al. | 717/101 |
| 2009/0113392 A1* | 4/2009 | Wijenayake et al. | 717/124 |
| 2009/0172657 A1* | 7/2009 | Makelainen et al. | 717/174 |
| 2010/0269094 A1* | 10/2010 | Levenshteyn et al. | 717/109 |
| 2010/0281392 A1* | 11/2010 | Allyn et al. | 715/744 |
| 2011/0154302 A1* | 6/2011 | Balko et al. | 717/140 |
| 2011/0209144 A1* | 8/2011 | Rowe et al. | 717/177 |
| 2012/0102483 A1 | 4/2012 | Goldman | |
| 2013/0047150 A1* | 2/2013 | Malasky et al. | 717/176 |
| 2013/0066947 A1* | 3/2013 | Ahmad et al. | 709/203 |
| 2013/0159994 A1* | 6/2013 | Rowe et al. | 717/177 |
| 2013/0166509 A1* | 6/2013 | Clark et al. | 707/638 |

OTHER PUBLICATIONS

Adobe, "Developing Adobe® AIR™ 1.5 Applications with HTML and Ajax," copyright 2008 crawled on Feb. 6, 2009 from Internet Archive.*
Internet Archive for Adobe, "Developing Adobe® AIR ™ 1.5 Applications with HTML and Ajax," pp. 2.*
Adobe, "Developing Adobe® AIR™ 1.5 Applications withADOBE® FLEX™ 3," crawled on Dec. 3, 2008 from Internet Archive.*
Internet Archive for "Developing Adobe® AIR™ 1.5 Applications with ADOBE® FLEX™ 3," pp. 2.*
Adobe Systems Incorporated, "Adobe—Exchange : Help", retrieved from internet at http://www.dreamweaverultradev.info/exchange/help/about_exchange.html, on Oct. 21, 2010, 7 pages.
Adobe Systems Incorporated, "Adobe Device Central CS4 : features", retrieved from internet at http://www.adobe.com/products/creativesuite/devicecentral/features, on Sep. 27, 2010, 4 pages.
Adobe Systems Incorporated, "Developing ActionScript Extensions for Adobe Flash Lite for the Digital Home", Adobe Systems Incorporated, 2009, 59 pages.
Adobe Systems Incorporated, "Adobe Device Central CS4", Adobe Systems Incorporated, 2008, 57 pages.
Wikipedia, "Adobe Flash", retrieved from internet at http://en.wikipedia.org/wiki/Macromedia_Flash, on Oct. 3, 2010, 19 pages.
Adobe Systems Incorporated, "Packaging Extensions with Adobe Extension Manager CS5", Adobe Systems Incorporated, 2010, 66 pages.
jminatel, "Using Sony Ericsson's Project Capuchin Platform Services API in Flash Lite" retrieved from internet at http://p2p.wrox.com/content/articles/using-sony-ericsson%E2%80%99s-project-capuchin, on Oct. 21, 2010, 3 pages.
Adobe Systems Incorporated, "ActionScript extensions", retrieved from internet at http://help.adobe.com/en_US/FlashLite/2.0_FlashLiteDevGuide2/WS78C2DA03-01F8-4, on Oct. 21, 2010, 2 pages.
Apple Computer, Inc. "Universal Binary Programming Guidelines, Second Edition", Jul. 24, 2006, retrieved from the internet at http://developer.apple.com/documentation/MacOSX.Conceptual/universal_binary/universal_binary.pdf, on Aug. 28, 2006, 96 pages.
LaMonica, "Flash to Jump Beyond the Browser", May 11, 2006, retrieved from the internet at http://news.com.com/Flash+to+jump+beyond+the+browser/2100-1007_3-6071005.html, on Jul. 12, 2006, 6 pages.
Macromedia, Inc. "Publishing Flash Documents—Version 8", retrieved from the internet at http://livedocs.macromedia.com/flash/8/main/00000805.html, on Aug. 16, 2006, 2 pages.
Macrovision "InstallShield MultiPlatform 5 (incl. SP3)", Oct. 27, 2003, retrieved from the internet at http://www.installshield.com/downloads/imp/imp_readme53.asp, on Aug. 28, 2006, 10 pages.
Macrovision "InstallAnywhere 7.1 Users Guide", 2006, retrieved from the internet at http://www.macrovision.com/downloads/products/flexnet_installshield/installanywhere/documentation/ia71_user_guide.pdf, on Jul. 11, 2006, 121 pages.
Microsoft Corporation "Windows Installer XML (WiX) Toolset", 2005 retrieved from the internet at http://wix.sourceforge.net/manual-wix2/wix_index.htm, on Jul. 11, 2006, 392 pages.
Sun Microsystems, Inc. "JAR File Specification", retrieved from the internet at http://java.sun.com/j2se/1.4.2/docs/guide/jar/jar.html, on Jan. 10, 2008, 14 pages.
Sun Microsystems, Inc. "Packaging Programs in JAR Files", retrieved from the internet at http://java.sun.com/docs/books/tutorial/deployment/jar/, on Jul. 20, 2006, 2 pages.
Swftools, "Flash Projector/Swftools.com", retrieved from the internet at http://www.swftools.com/tools.com/tools-category.php?cat=290, on Aug. 16, 2006, 3 pages.
"Adobe SWC File", Retrieved from: <http://en.wikipedia.org/wiki/Adobe_SWC_file> on Jan. 29, 2013, (Oct. 3, 2010), 2 pages.
"Non-Final Office Action", U.S. Appl. No. 12/910,776, (Jan. 9, 2013), 8 pages.
Elrom, Elad et al., "AdvancED Flash on Devices: Mobile Development with Flash Lite and Flash 10", *Apress and Friends of ED books,* (Aug. 10, 2009), 227 pages.
"Final Office Action", U.S. Appl. No. 12/910,776, (Aug. 1, 2013), 10 pages.
"Notice of Allowance", U.S. Appl. No. 12/910,776, Nov. 22, 2013, 7 pages.

* cited by examiner

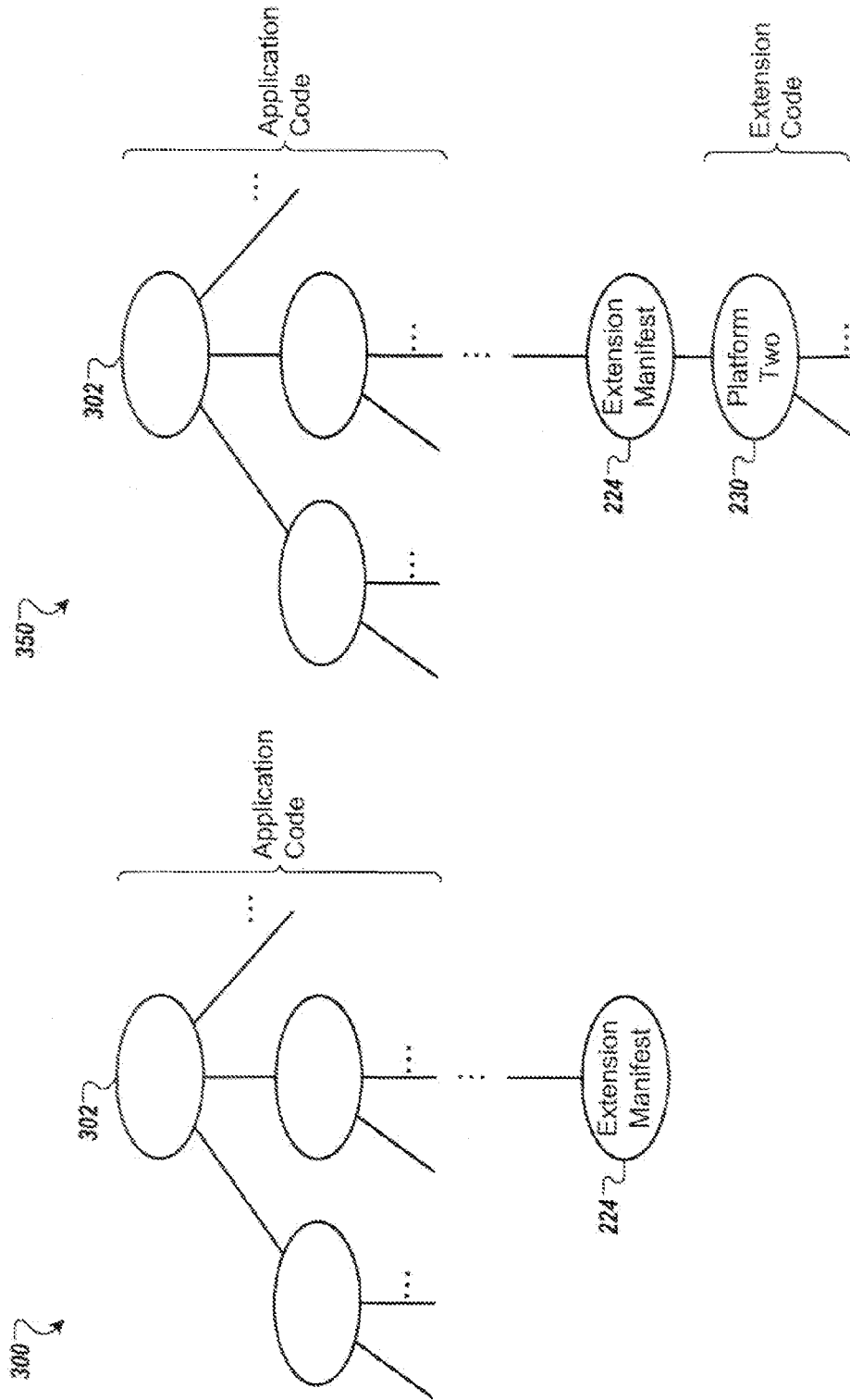

RUNTIME EXTENSIONS

BACKGROUND

This specification relates to supporting native program code extensions for cross-platform managed code environments.

A cross-platform managed code environment is a set of software that includes a runtime that has been written and compiled to run on multiple different computing platforms, and also often includes a software development kit (SDK) used by programmers to author and package (for installation) applications that operate on the runtime. Typically, each of the different computing platforms includes its own particular instruction set architecture (ISA) and operating system (OS) and has at least one associated type of native program code, which is the machine language or higher level programming language used for programs that run on that computing platform. For example, the x86 ISA and WINDOWS® OS (which support applications programmed in the C programming language) are a common computing platform for desktop computers. In addition, computing platforms can include other consumer electronic devices, such as smart phones and network enabled televisions, which can have different native code, instruction set architectures and operating systems, such as the ANDROID® OS.

The runtime provides a collection of utility functions that support an application program while it is running, often working with the OS of the computing platform to provide facilities (e.g., support for vector and raster graphics, bidirectional streaming of audio and video and one or more scripting languages). The utility functions can be called through an application programming interface (API) of the runtime, and since the runtime is available for installation on multiple different computing platforms, an application programmer can write application programs to operate on the runtime and is free to disregard the details of any specific computing platform where that application program may eventually be installed and operated. Examples of runtimes include JAVA® Virtual Machine (JVM), .NET, and ADOBE® AIR® software.

In addition, in some cases, the API of the runtime can be extended by program developers or computing platform manufacturers to add additional utility functions for use by application programs in order to augment the API provided by the runtime developer. Such extensions can sometimes include native code and can be added to the runtime through an extension mechanism provided by the runtime developer to allow application developers and device manufacturers to create new APIs (e.g., in JAVA® or ActionScript® code) that provide new functionality. Because such extensions contain native code, they are specific to the target platform (e.g. WINDOWS® OS or MAC® OS). For device manufacturers (i.e., $2^{nd}$ party developers) this often creates no issues since they sometimes prefer their extensions to be limited to their own computing platform. In contrast, for application developers (i.e., $3^{rd}$ party developers) who wish to work with an extension across multiple computing platforms, they often must create multiple versions of the extension, one for each computing platform.

SUMMARY

This specification describes technologies relating to runtime extensions.

In general, one innovative aspect of the subject matter described in this specification can be embodied in methods that include the actions of: obtaining, at one or more data processing apparatus, a package of information defining an extension to an application program interface of a runtime, the package of information including native program code and descriptors that identify different computing platforms supported by the extension; obtaining, at the data processing apparatus, a declaration of a target computing platform for an application program that employs the extension; comparing, at the data processing apparatus, the declaration of the target computing platform for the application program with the descriptors that identify the different computing platforms supported by the extension; if the target computing platform is supported by the extension, generating, at the data processing apparatus, an installable package for the application program; and if the target computing platform is not supported by the extension, providing a notification corresponding thereto. Other embodiments of this aspect include corresponding systems, apparatus, and computer programs, configured to perform the actions of the methods, encoded on computer storage devices.

These and other embodiments can each optionally include one or more of the following features. The obtaining can include obtaining a declaration of multiple target computing platforms, and the comparing can include comparing the declaration of the multiple target computing platforms with the descriptors that identify the different computing platforms supported by the extension. The method can include: if the target computing platform is supported by the extension, determining whether the extension is pre-installed on the target computing platform; and if the extension is not pre-installed on the target computing platform, the generating can include adding a portion of the package of information defining the extension to the installable package for the application program, the added portion including native program code corresponding to the target computing platform.

The package of information defining the extension can include application program interface (API) definitions corresponding to a scripting engine employed by the runtime and conforms with a program library format employed by a software development kit that does not recognize the native program code. The package of information can include discrete platform directories corresponding to the different computing platforms supported by the extension, the package of information including a default platform directory including a version of the extension written in runtime code that is independent of the different computing platforms supported by the extension, and the method can include, during application development: if the target computing platform is not specified, using the version of the extension written in the runtime code that is independent of the different computing platforms supported by the extension; and else, using native program code corresponding to the target computing platform. In addition, the version of the extension written in the runtime code that is independent of the different computing platforms supported by the extension can be a simulation of the extension.

The subject matter described in this specification can be embodied in a computer storage medium encoded with a computer program, the program including instructions that when executed by data processing apparatus cause the data processing apparatus to perform operations of the methods described herein. In addition, in general, one innovative aspect of the subject matter described in this specification can be embodied in a system that includes: an input device; an output device; and one or more computers operable to interact with the input and output devices, to provide a cross-platform managed code environment, and to obtain a package of information defining an extension to an application program interface of a runtime, the package of information including native program code and descriptors that identify different computing platforms supported by the extension, use a version of the extension written in runtime code that is independent of the different computing platforms supported by the extension, when a computing platform is not specified, and use native program code corresponding to the computing platform, when the computing platform is specified.

The version of the extension written in the runtime code that is independent of the different computing platforms supported by the extension can be a simulation of the extension. The one or more computers can be operable to: obtain a declaration of a target computing platform for an application program that employs the extension, compare the declaration of the target computing platform for the application program with the descriptors that identify the different computing platforms supported by the extension, generate an installable package for the application program, if the target computing platform is supported by the extension, and provide a notification if the target computing platform is not supported by the extension.

The one or more computers can be operable to: obtain a declaration of a target computing platform for an application program that employs the extension, determine whether the extension is pre-installed on the target computing platform, generate an installable package for the application program without a corresponding portion of native code, if the extension is pre-installed on the target computing platform, and generate an installable package for the application program with a corresponding portion of native code, if the extension is not pre-installed on the target computing platform.

The one or more computers can be operable to generate the installable package for the application program with the corresponding portion of native code by adding a platform directory from the package of information defining the extension to the installable package for the application program in a relative location in the installable package for the application program that matches a relative location of the platform directory in the package of information defining the extension. The package of information defining the extension can include application program interface (API) definitions corresponding to a scripting engine employed by the runtime and conforms with a program library format employed by a software development kit that does not recognize the native program code. The package of information can include discrete platform directories corresponding to the different computing platforms supported by the extension.

The discrete platform directories corresponding to the different computing platforms supported by the extension can include different platform directories for each combination of instruction set architecture (ISA) and operating system (OS) forming one of the different computing platforms. The one or more computers can include a server operable to interact with the input and output devices through a data communication network. Alternatively, the one or more computers can consist of one computer including input and output devices.

Particular embodiments of the subject matter described in this specification can be implemented so as to realize one or more of the following advantages. An extension mechanism to a runtime can significantly improve the workflow for both extension and application developers by reducing the materials published by the extension developer to a single file and incorporating enough information in that file to validate and optimize for the target platform when publishing the application. A native extension (i.e., plugins containing native code) with implementations of the extension on multiple computing platforms can be treated as a single item, where the extension mechanism can identify, separate, and manage the cross-platform and platform-specific portions of the extension during application development and deployment.

During application development, a native extension that is intended to run on computing platforms that are different than the development platform (e.g., an extension for mobile devices, where applications that use the extension are developed on desktop computers) can provide an alternate implementation (e.g., a simulation of the extension) that is used as the default during application development. The alternate implementation can be a cross-platform implementation that only uses scripting code corresponding to a scripting engine built into a cross-platform runtime. For example the alternate implementation can be a simulation of the extension that operates on a desktop computer and simulates how the extension's native code will operate on the various supported mobile device platforms. This can significantly improve the workflow for developing mobile applications that leverage native extensions.

In addition, the extension mechanism can provide a unified extension framework that can support any combination of extensions deployed with applications, bundled with devices, or installed by users. The extension mechanism can support individual extensions that are deployed in different ways depending on the target device. Thus, one extension can support different deployment models (e.g., second party extensions where the extension is pre-installed on the device where the application will run, and third party extensions where the extension is bundled with the application that uses the extension) in order to target a variety of platforms. Thus, various combinations of extension deployments can be supported while keeping a streamlined workflow for extension and application development.

A single extension can operate over a wider range of use cases, spanning digital home, desktop, and mobile. Moreover, the model for native extensions can be defined such that they include both managed code (e.g., script that corresponds to a scripting engine employed by a cross-platform runtime) and native code (e.g., C code), where the managed code runs in a domain distinct from the application using the extension. Calls to native functions can be restricted to managed code running in this domain, thus making it significantly easier to avoid dangerous errors in native code related to unexpected parameters, parameter values, and the like. This can provide a safer and easier way to implement native extensions, which reduces the risk of vulnerabilities and allows validation code to be written in managed code.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A is a diagram showing an example of an application installation package where the application uses an extension previously deployed to the target computing platform.

FIG. 3B is a diagram showing an example of an application installation package where the application uses an extension that is included with the application package for deployment to the target computing platform.

Like reference numbers and designations in the various drawings indicate like elements.

DETAILED DESCRIPTION

Figure 1A:
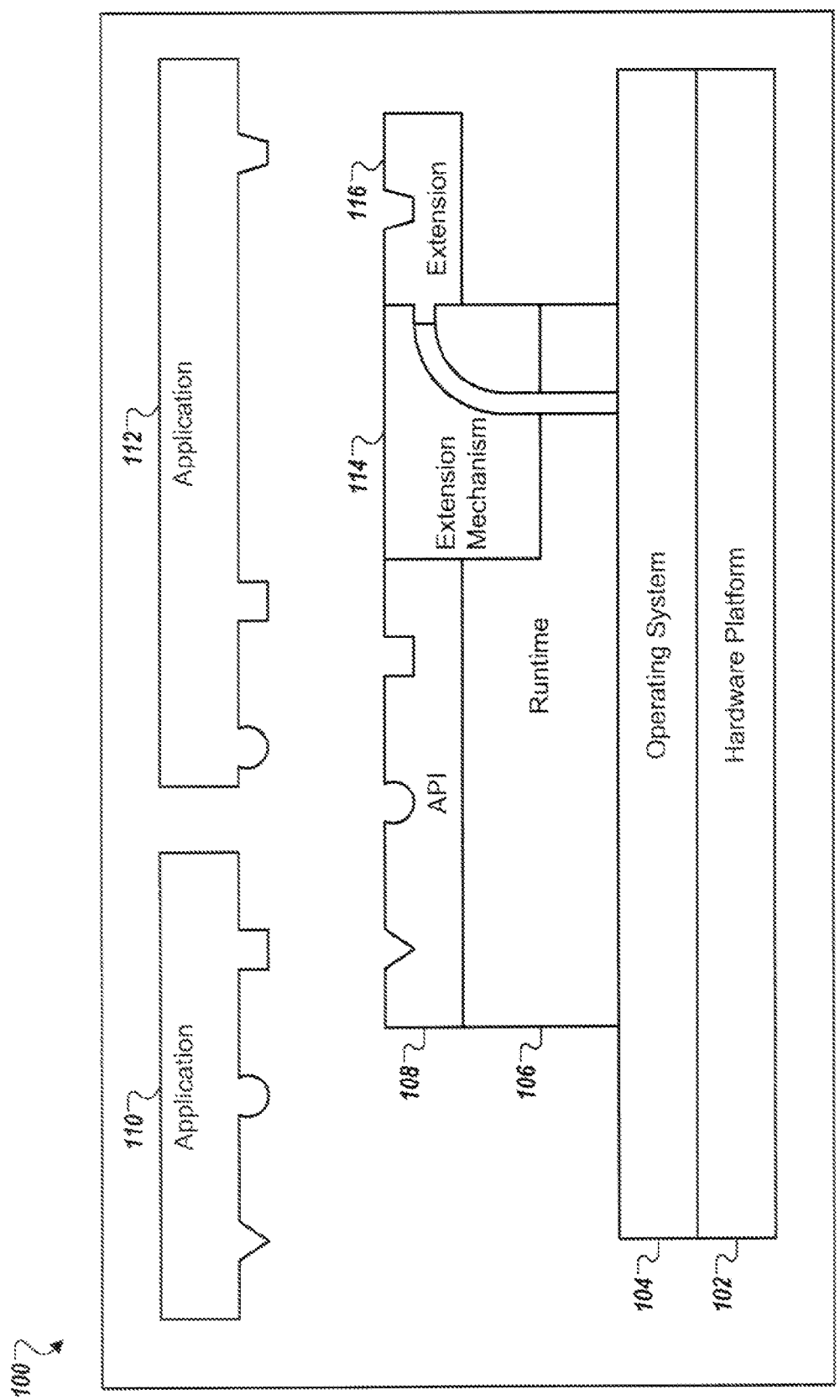
FIG. 1A is a diagram showing an example of a system that hosts and interprets applications in a runtime having an extension mechanism to extend an API of the runtime.

As shown in FIG. 1A, a system 100 hosts applications in a runtime environment. A hardware platform 102 can include the physical components of a computing device or a device that, among other features, can perform computing actions. Example computing devices can include, but are not limited to, personal computers, network servers, mobile telephones, televisions, and Global Positioning System (GPS) devices. The hardware platform of some or all of these computing devices can include a central processing unit (CPU), random access memory (RAM), disk storage, input devices (keyboard, mouse, touchscreen, hardware buttons, infrared or radio receiver, microphone, video ports, etc.), output devices (video screens, lights, speakers), data ports for wired or wireless data connections, sensors (global positioning sensor, accelerometer, etc.) and/or ports for peripheral device connections.

Access and control of the hardware components can be provided by the hardware platform 102 through an instruction set architecture (ISA). Some ISAs provide functions and/or commands to read and/or write values to hardware addresses in order to read or control a particular hardware device. For example, a write command for a video card can provide functionality to fill a display buffer with pixel values, and a second command can provide functionality to set that video buffer to display.

Some ISAs are generalized to work for a variety of hardware components and for a range of hardware configurations. For example, CPUs made by different manufacturers and based on different hardware structures can both support the same, or very similar, ISAs. Alternatively, some hardware, such as purpose specific hardware that is custom made for a particular task, may have a unique ISA that is not shared by any other hardware components.

An operating system (OS) 104 is a software layer that can interface with a hardware platform 102 and provide an operating environment. The operating system 104 can provide common services for efficient access to a variety of hardware platforms 102, or the operating system 104 may be specific to a single hardware platform 102.

Services in the OS 104 can be organized in a way that facilitates use by software executing in the OS 104, even if the organization of those services does not map directly to the organization of the hardware platform. For example, the hardware platform 102 can include an Ethernet adapter and a Wi-Fi adapter. Either or both of these adapters may have an active network connection, and both adapters may be organized together in the hardware platform 102 as network devices. The OS 104 can provide a network stack for all network data. The network stack can prioritize the Ethernet adapter above the Wi-Fi adapter so that the network stack—and any software using the network stack—utilizes the Ethernet adapter, if available, for data communication. In this example, only if the Ethernet adapter is unavailable or does not have a data connection does the network stack—and any software using the network stack—use the Wi-Fi adapter. Some services provided by the OS 104 can include input and/or output functionality through particular channels. For example, pointing device services can provide to software a uniform interface for any pointing device hardware, including mice, trackballs, and touchscreens.

For some OSs 104, hardware drivers are used to communicate with a particular hardware device. The hardware driver can translate functions of the OS 104 into the appropriate ISA. Drivers can be changed and new drivers can be installed in the operating system 104 to work with new or changed hardware in the hardware platform 102. In some cases, the changed or new drivers can provide the same interface as a replaced driver, which can create a consistent interface to the OS 104. In some other cases new or changed hardware drivers can provide a new or changed interface.

A runtime 106 provides a collection of utility functions that support an application program while it is running, often working with the OS 104 of the computing platform to provide facilities (e.g., support for vector and raster graphics, bidirectional streaming of audio and video and one or more scripting languages). Some services may be provided by the runtime 106 that are absent from the OS 104. For example, the runtime 106 can manage garbage collection and memory deallocation, even if the OS 104 does not. The runtime 106 can also provide security domains for application programs to limit or alter the services provided by the operating system 104. When installing or running an application in the runtime 106, a security domain can be selected based on user input or a certification system. In addition, the runtime 106 can be a cross-platform runtime that has been written and compiled to run in multiple different operating systems on multiple different computing platforms, both as a stand-alone program and as a plug-in to different browser program (or other programs) installed on various computers, thus allowing application developers to readily develop applications that can run in many different computing environments.

The utility functions can be called through an application programming interface (API) 108 of the runtime 106. Since the runtime 106 is available for installation on multiple different computing platforms, an application programmer can write application programs 110 and 112 to operate on the runtime and is free to disregard the details of any specific computing platform where that application program may eventually be installed and operated. However, some services desired by the application programmer and provided by the OS 104 and/or the hardware platform 102 may not be exposed through the API 108. In order to work with a wide variety of computing platforms, only a subset of all possible OS 104 and hardware platform 102 services may be supported by the runtime 106. For example, a runtime 106 for computers and consumer devices may not support channel control OS services for network enabled televisions or lighting control OS services for home automation systems.

An extension mechanism 114 can support extensions 116 that provide services not available in the API 108. Some of these services can be independent of the underlying OS 104 or hardware platform 102. These services can include a data structure library; document templates; multimedia such as image, video, or audio content; or other services that can be built from the functions available in the API 108. Other extensions 116 can expose services from the OS 104 or the hardware platform 102 that are not exposed in the API 108. For example, the channel control or lighting control. OS services can be exposed to the application 112 by the extension 116. The extension 116 can contain instructions compiled from code native to the OS 104 and/or hardware platform 102. This native code may be executed in the operating system 104 under the control of the runtime 106. For example, use of the native code in the extension 116 may be under the control of the runtime's security policies and not invoked unless the application 112 meets a set of security requirements. Some native code in the extension 116 may be permitted to render through the OS 104 and hardware platform 102 directly to an output device, such as a display screen, without participating in the runtime's display pipeline. For example, native code for video playback can use the video playback mechanisms of the OS 104. Some native code in the extension 116 can be integrated in the runtime's display pipeline. For example, a bitmap created by the OS 104 can be layered above or below other object in the runtime's display, and can be translated, rotated, skewed, filtered, or otherwise affected before display.

Example functions of the API provided by the extension mechanism 114 to the extension 116 can include initializers for initializing an extension when it is loaded by a runtime; finalizers to clean up associated state and destroy associated objects; object assessors for access to generic objects as well as specific types of objects such as bitmaps, byte arrays, arrays, and vectors and primitive data types; callback functions for asynchronously creating status events to be dispatched to executing content objects, and exceptions for asynchronously creating exception messages.

An extension 116 can be specific to OS 104 and/or hardware platform 102, or specific to a set of multiple OSs and hardware platforms. The extensions 116 can expose the same interface to applications, but may contain different logic or native code for each OS and hardware platform combination. For example, the runtime 106 may operate on two different OSs, and an extension 116 can be designed that exposes a library for event logging. If these two OSs support two different logging services with different logic and different functions, the extension 116 can be created with two sections of hardware specific code, one for each OS. When the runtime 106 on one of those OSs hosts an application 112 that requires the logging extension 116, the portions of the logging extension 116 for the appropriate OS is used.

Some extensions may be created by the developer of the operating system 104 or the manufacturer of the hardware platform 102. For example, a computer or consumer device may be sold with the runtime 106 and the extension 116 preinstalled so that each such computer or consumer device will include support in the runtime 106 for a particular hardware or software service. Some extensions may be bundled with an application that will use the extension. For example, the application 112 may be designed to always require access to native code, and the application 112 can be bundled with the extension 116. Moreover, the extension mechanism 114 can support both device bundling and application bundling of an extension 116.

Figure 1B:
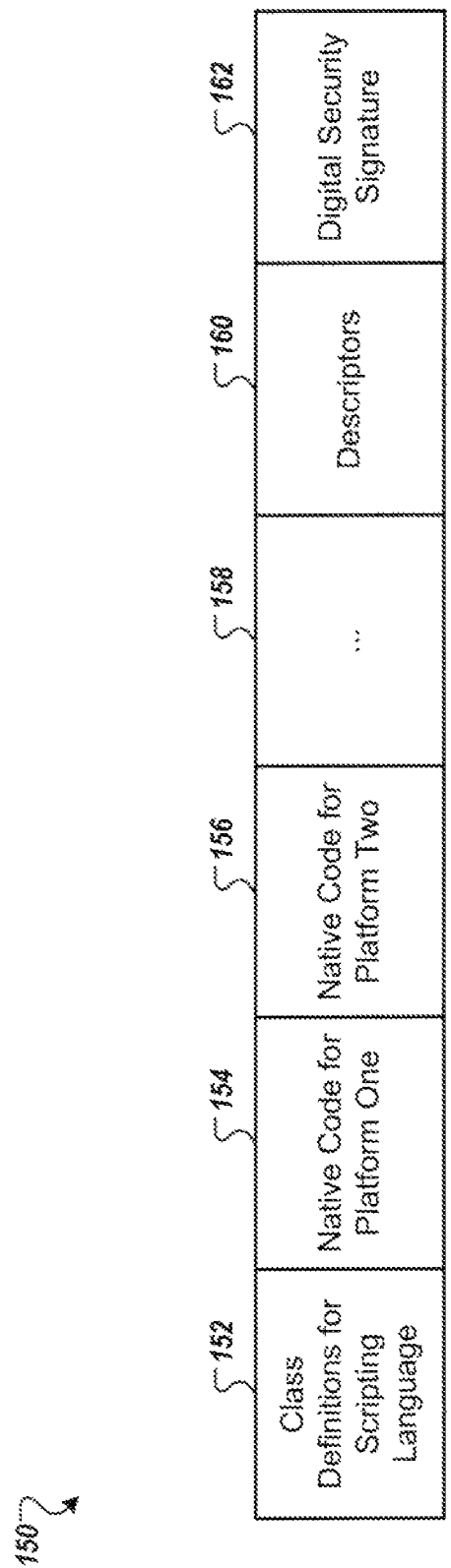
FIG. 1B is a diagram showing an example of an extension having native code for multiple different computing platforms.

As shown in FIG. 1B, an example extension 150 has native code for multiple computing platforms. The extension 150 can be used, for example, as an extension to the runtime 106 in FIG. 1A. The extension 150 can be a file that is compressed by means of an archive format similar to, or based on, the ZIP archive format, where the information of the file can be maintained in a directory structure represented in the single file. A class definition 152 can include class definitions in the language (e.g., ActionScript® code) of a runtime that will host the extension 150. The class definition 152 can include object types, functions, and parameters that expand the API of the hosting runtime. Also included in the class definitions 152 may be private classes used by the extension 150.

The class definitions 152 can provide a uniform API for native code in the extension 150. Some native code may be more prone to some kinds of attacks (e.g., buffer overrun, code injection, etc.) than a runtime environment. Applications using the extension 150 may access the extension 150 through the class definitions 152, which can afford extension developers the opportunity to prevent potentially harmful input to native code by applications. Moreover, objects created with the class definitions 152 can be represented as opaque handles to insulate extensions from runtime implementation details and from native code objects.

Native code for supported platforms is contained in platform sections 154-158. Although native code for three platforms is shown here, it will be understood that native code for more or fewer platforms are possible. Each platform section 154-158 includes code to fulfill the functions of the API of the class definitions 152 into native commands (as needed) and logic for a particular platform. The exact nature of the platform sections 154-158 can vary depending at least on the associated platform. In some implementations, some native code can be associated with two or more platforms, such as when multiple hardware systems implement the same ISA, or when only OS calls, but no ISA calls, are needed. Some of the platform sections 154-158 can include two or more files, at least a first file containing native code objects and at least a second file containing managed code (e.g., scripting language code) used for that platform (note that the managed code is not native code, but may contain logic that is only applicable for that platform).

The way in which the native code of the platform sections 154-158 links against the class definitions 152 can vary by platform. On some platforms, the native code can be compiled as a shared library and dependencies on functions provided by a runtime can be satisfied at load time. For some platforms, native code can be compiled as a static library, and linking can occur at packaging time. In some implementations, this model can permit a native code extension 150 to be used on a platform for which no native code elements exist; for example, for debugging a program that uses the native code extension 150. This model can also permit creation of a native code extension 150 that includes a platform section 154 that actually consists entirely of script code; for example, for an action accomplished entirely through socket communication. For platforms on which extensions are dynamically loaded, extensions can make use of platform-defined initialization facilities.

Descriptors 160 can contain deployment information, a name for the extension 150, a version number, a description, copyright statement, and/or associated icon relating to the extension 150. This information can include a namespace for the native code extension 150, minimum version of a runtime required, an initializer class to be run upon loading of the extension 150, an indicator specifying if the extension 150 is device-bundled or application-bundled, and mapping information specifying which platform section 154-158 is associated with which platform. In some implementations, platforms can be identified by a unique, human readable string that specifies an OS and ISA. Some example platform names can include "Windows-x86," "MacOS-x86", "Linux-x86," "Android-ARM," "Windows-x86-64," "MacOS-x86-64," "Linux-x86-64," "Android-x86," and "iPhone-ARM."

A digital security signature 162 can contain data used to authenticate the extension 150. The digital signature 162 can be created by the extension developer by hashing the extension 150 without the digital security signature 162, and encrypting the hash with a private encryption key. The digital security signature 162 can later be decrypted using the extension developer's public encryption key and comparing that to a hash of the extension 150 without the digital security signature 162. If the two hashes match, it can be concluded that the copy of the extension 150 is valid and unaltered.

An example file structure for the extension 150 is shown in Table 1 below.

TABLE 1

Example File Structure of an Extension

| File Name | Description |
| --- | --- |
| mimetype | Descriptors 160 |
| META-INF\signatures.xml | Digital Security Signature 162 |
| RUNTIME\extension.xml | Descriptors 160 |
| RUNTIME\<platform> | Descriptors 160 |
| RUNTIME\library.swf | Platform Section 154-158 |
| RUNTIME\<library file> | Platform Section 154-158 |
| RUNTIME\catalog.xml | Descriptors 160 |
| RUNTIME\library.swf | Class Definitions 152 |

Figure 2A:
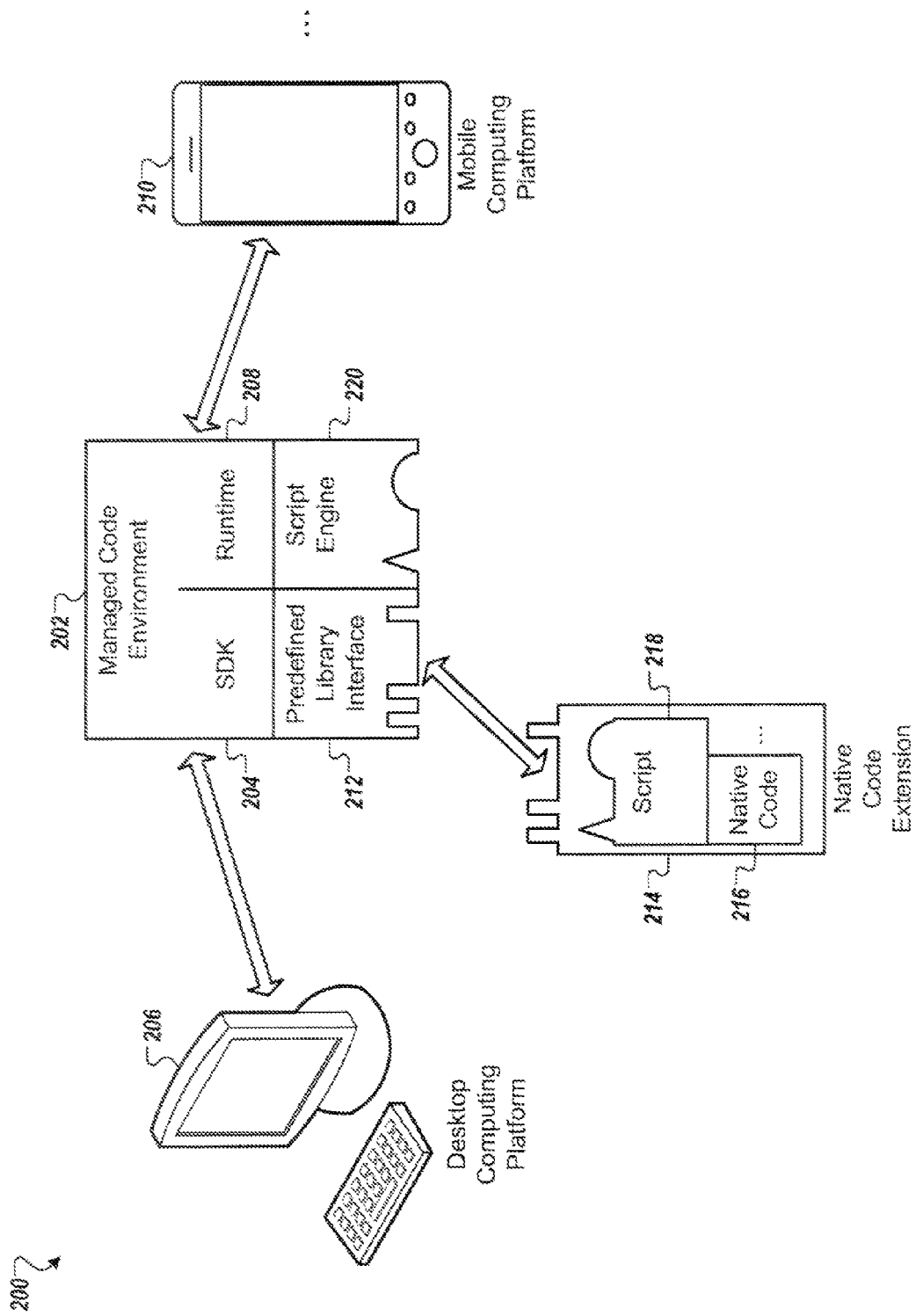
FIG. 2A is a diagram showing an example of a system in which applications can be developed for a cross-platform runtime having an extension thereto, and an example of a format for the extension.

As shown in FIG. 2A, a system 200 provides an environment in which applications can be developed for a cross-platform runtime having an extension thereto, and an example of a format for the extension is shown. A managed code environment 202 can include a software development kit (SDK) 204 residing on a desktop computing platform 206. The SDK 204 can include a set of authoring tools that allow for development of applications that run in an associated runtime 208, which also reside on one or more mobile computing platforms 210. Such tools can include integrated development environments (IDEs), debuggers, emulators, code generators and code completion tools.

The SDK 204 can include a predefined library interface 212 through which libraries and extensions to the runtime 208 can be loaded. The script code in loaded libraries and extensions may then be available to the SDK 204 for use by application developers and authoring tools. For example, code completion tools can index function calls in an extension and provide them to application developers as they write code. These extension files can be packaged as archive files, such as SWC files.

A native code extension 214 is an extension that includes script code 218 as well as native code 216 for each of the mobile computing platforms 210. The script code 218 can provide a software layer through which the native code 216 can be accessed. As with extensions that do not contain native code, the script code 218 can be used by authoring tools in the SDK 204 on the desktop computing platform 206. During runtime, a script engine 220 of the runtime 208 on a particular mobile computing platforms 210 can access the script code 218 contained in the native code extension 216 for the appropriate mobile computing platform 210. In some implementations, the native code extension 214 can be packaged in an archive file. This archive file may have the same file format as extensions that do not contain native code, and thus can readily plug into the predefined library interface 212, even if the archive file does not have the same file extension. For example, the native code extension 214 can be packaged in an archive file, which can have the same file format as a SWC file format, and this archive file can be called an ANE file.

When packaging an application into a deployment package, a packaging tool in the SDK 204 can be configured to identify the native code extension 214 as containing native code. The packaging tool can examine the native code extension 214 and include any discovered dependencies with the dependencies of the deployment package. These dependencies can include a minimum runtime version and computing platform.

Some applications can be packaged for specific platforms. The packaging tool can validate the application against the native code extension's requirements to ensure compatibility. If a mismatch is detected, for example while packaging an application of a particular OS, and the native code extension 214 does not support that OS, then the packaging can stop, and a user can be alerted. A signature of the native code extension 214 can also be validated by the packaging tool. The native code extension 214 may be signed by the developer of the application, for example if the application developer also created the native code extension 214.

For application-bundled extensions, any, some, or all of the extension's extension descriptors, platform specific directories, and additional files in the extension package can be bundled with the application. For device-bundled extensions, in some implementations, only the extension descriptors need be bundled with the applications. In some implementations, this can permit the runtime 208 to select not to use the native code extension 214, and to instead use a different version.

Figure 2B:
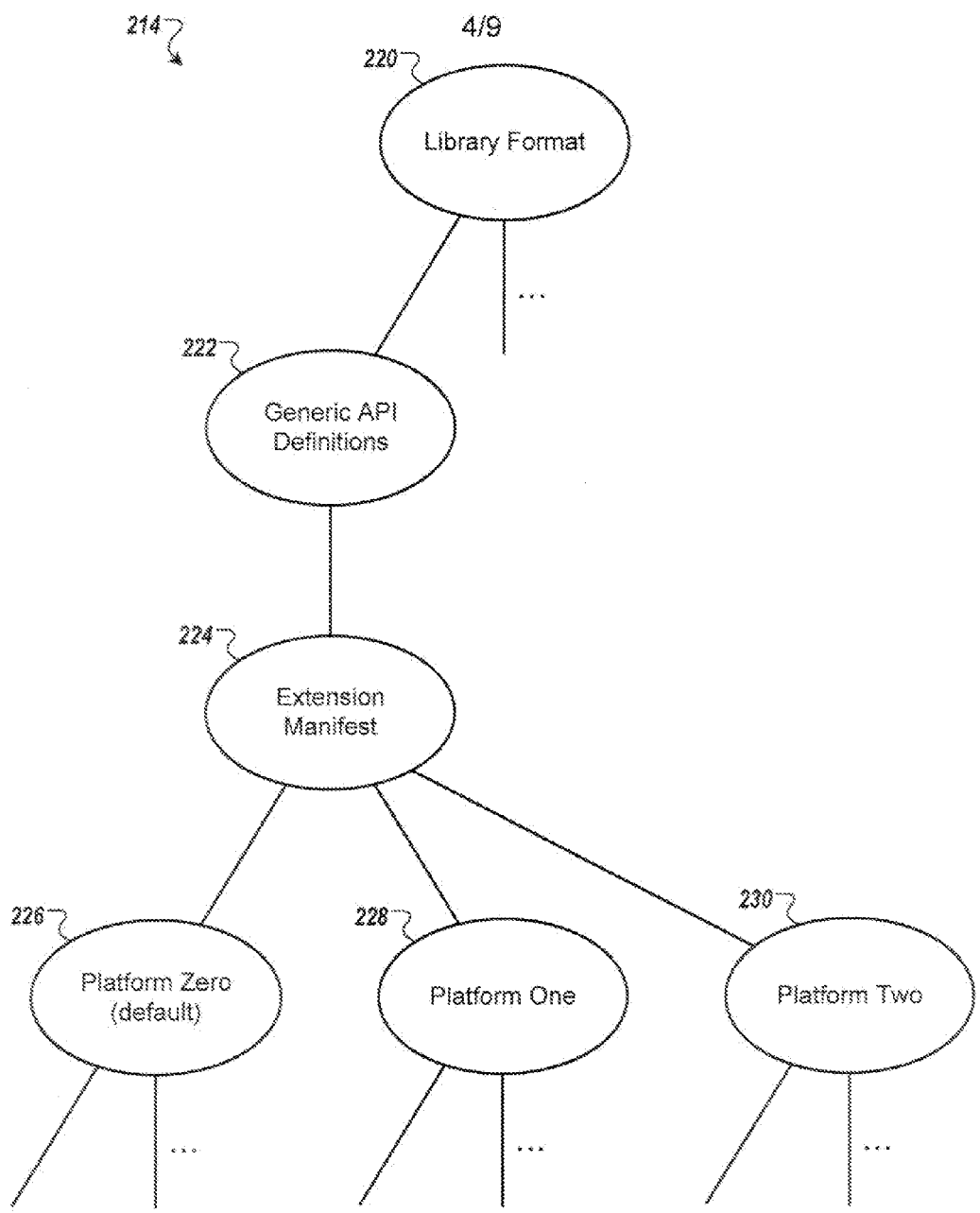
FIG. 2B is a diagram showing another aspect of the format of the extension shown in FIG. 2A.

As shown in FIG. 2B, the logical structure of the native code extension 214 can contain native code for multiple platforms, including a test platform. The logical structure shows a hierarchy of extension components of the native code extension 214. This hierarchy can represent the order of use of components of the native code extension 214, for example by authoring tools or a runtime loading the native code extension 214.

A library format 220 can be the entry point of the native code extension 214. The library format 220 can include metadata information such as the name, description, version number, and namespace of the native code extension 214. In addition, the library format 220 can conform to an established format, as described above, such that it can readily plug into the predefined library interface 212.

Generic API definitions 222 may identify the name and type of services provided by the native code extension 214. The generic API definitions 222 provide a script language interface to call native code functionality, regardless of the platform on which the native code extension 214 is being used. The generic API definitions 222 can be used in code completion and code generation tools in a development environment. In some implementations, the native code extension 214 can include multiple generic API definitions 222. For example, a network enabled television may have separate generic API definitions 222 to control the television display, to query program listings data, and to control volume settings. In some examples, all of these functions can be included in a single generic API definition 222.

Each generic API definition 222 can be associated with an extension manifest 224. The extension manifest can map the generic API definition 222 with native code associated with the platform hosting the native code extension 214. In some implementations, a platform can be specified by a global variable or constant, by a namespace value, or by an initialization routine.

Native code sections for platforms zero through two 226-230 contain native code objects (and potentially non-native code, such as script code corresponding to the script engine 220) that can receive messages from, and reply to, the generic API definitions 222. Although three platforms are shown here, it will be understood that more or fewer supported platforms for a native code extension are possible. From a high level of abstraction, the native code elements for platforms zero through two 226-230 may be thought of as identical, in that they can receive the same types of messages from the generic API definitions 222 and can respond with the same types of replies. From a lower level of abstraction, however, the native code elements for platforms zero through two 226-230 operate in different ways. For example, each of the native code elements for platforms zero through two 226-230 may be used to render a video file to an output device, will each respond to such requests with the same result codes, and will each cause the video file to be displayed. However, platform specific difference may necessitate that each of the native code elements for platforms zero through two 226-230 call different platform services to render a video file.

In some implementations, a default platform can be used in development, testing, and debugging of a native code extension and/or an application using a native code extension. The native code element for platform zero 226 may contain test or default functionality that may contain only script code that simulates native code, but does not access any platform services. For example, the developer of an application targeting location-aware mobile devices, and which uses an extension that provides a location-sensing API, may wish to develop the application on a desktop computer platform that does not support location sensing. In this case, the native code element for platform zero 226 may not contain any native code, but may contain script code that generates a random, valid, location result in response to a request to simulate the result of native code. With this functionality, the application developer can test and debug the application before loading it onto a device with a platform on which the extension does support location sensing. In some examples, the native code element for platform zero 226 can call a service in a platform emulator residing on the development platform, which generates the random, valid, location result. In some cases, the platform associated with the native code element for platform zero 226 is also a valid deployment platform where the tested application will be deployed to, as well as a test platform.

In another example of the native code extension 214, a developer can create an application in the system 200 that uses the native code extension 214 and will be deployed to at least two mobile computing platforms 210. The application developer can package the application into two deliverable packages, one for each mobile computing platform 210. On one of the mobile computing platforms 210, the native code extension 214 is pre-installed on the mobile computing platform 210. For this package, a manifest file describing the native code extension 214 is included in the package, but the native code need not be included. On the other mobile computing platform 210, the native code extension 214 is not pre-installed, and thus the native code corresponding to that mobile computing platform is included in the distribution package.

As shown in FIG. 3A, an example of an application installation package 300 is shown, wherein the application is created in the system 200 and uses an extension previously deployed to a target computing platform. For example, the manufacturer of a device can include a scripting language runtime that can host scripting language applications or other software objects. The scripting language runtime can include a native code extension that supplies one or more device specific APIs to software objects in the scripting language runtime.

Application code 302 can include software elements written in the SDK 204. The application code 302 may be platform independent, in that it may be executable on the runtime on any platform that provides a minimum required API specified in the extension manifest 224.

The application code 302 can be packaged with the extension manifest 224. The extension manifest 224 can include descriptors of a native code extension used to develop the application code 302. A namespace and version number in the extension manifest 224 can define the minimum native code extension version required by the application code 302. A platform that includes the specified version of the native code extension may be configured to support the application code 302. In some examples, a platform with a newer version of the specified native code extension can also support the application code 302; for example, if the newer version of the native code extension is backwards compatible to the version specified in the extension manifest 224.

Described here is one example use of the application installation package 300. A set top box manufacturer produces a set top box version 1. This set top box includes a scripting language runtime, a set top box native code extension version 1.a to provide functions to control the television, and a runtime application to download and launch on-screen widgets. Later, the set top manufacturer produces another set top box, version 2, that includes control for a surround sound system. The set top box native code extension is updated with functionality to control the surround sound system, and labeled version 1.b.

A widget developer develops two widgets for use on set top boxes. The first widget downloads and displays information about the programming displayed on the television. This first widget, which only uses television control, is developed with version 1.a of the set top box native code extension, and the first widget's included extension manifest specifies version 1.a. The second widget controls the audio settings of a surround sound system based on the type of programming on the television. The second widget is developed with version 1.b of the set top box native code extension, and the second widget's extension manifest specifies version 1.b.

In this example, the first widget is useable on set top box version 1 and version 2. The first widget is compatible with version 1 because this version of the set top box includes the exact version of the set top box native code specified by the extension manifest. The first widget is also compatible with version 2 because this version of the set top box includes a newer version of the set top box native code than that which is specified by the extension manifest. In some examples, such as when set top box native code version 1.b is not backwards compatible to version 1.a, the set top box version 2 may also include set top box native code extension version 1.a.

For the second widget in this example, only the set top box version 2 is supported. Only version 1.a of the set top box native code extension, which does not have support for surround sound control, is included with version 1 of the set top box. As such, an attempt to load the second widget on the set top box version 1 can produce an error informing the user that the widget is not supported. Alternatively, at packaging time for the second widget, the target set top box version 1 is identified, and the necessary native code extension version 1.b is thus identified and packaged with the widget installation package (if the set top box version 1 allows installation of native code extensions by application installers).

As shown in FIG. 3B, an example of an application installation package 350 is shown where the application uses an extension that is included with the application package for deployment to a target computing platform. For example, the developer of application code 302 can create or incorporate a native code extension for use by the application code 302. This native code extension can be packaged with the application code 302 for distribution as a single file. As such, the installation package 300 and 350 can contain the same application code 302, but can differ because they are created for different target platforms, of which only some of the platforms are bundled with the native code extension 214.

The application code 302 can be packaged with the extension manifest 224, platform specific code element 230 and potentially other platform specific code elements (not shown.) A namespace and version number in the extension manifest 224 can define the minimum native code extension required by the application code 302. Platforms specified in the extension manifest 224 can be configured to support the application code 302. In some examples, a platform not listed in the extension manifest 224 may support the application code 302; for example, if a runtime on the platform includes the version of the native code extension specified in the extension manifest 224 or a newer version that is reverse compatible to the specified version.

In some implementations, the installation package 350 may be packaged for two or more target platforms. In some of these cases, additional native code elements such as the native code element 228 and others (not shown) can be included in the installation package 350.

As shown in FIGS. 3A and 3B, the generic API definitions 222 can be left out of the application installation packages 300 and 350 entirely. In addition, the platform specific code element 230 (as well as the other such code elements) can be multiple files bundled together in a platform directory. This platform directory can be placed in the application installation package in a relative location that matches the relative location of that same platform directory in the extension package. In some implementations, this means the platform directory will be six or seven levels deep in the application package.

In some implementations, the files that make up a native code extension and are packaged with an application are in the same location relative to each other as when they are packaged in a native code extension. In some implementations, these files may reference each other—for example, code that might need to load an image from an external file. Because their relative locations can be preserved, the files can use the same relative paths to reference each other whether they are in the extension package or the application package. In addition, in some implementations, a separate platform directory may be needed for each combination of ISA and OS (e.g., a separate platform directory for an x86 WINDOWS® OS machine than for an x86-64 WINDOWS® OS machine).

Returning now to the example of the set top boxes with on screen widgets, a digital video recorder (DVR) manufacturer produces a DVR. The DVR includes the same scripting language runtime as the set top boxes and a runtime application to download and launch on-screen widgets, but does not include either of the native code extensions 1.a or 1.b. However, the DVR is listed in the extension manifest of the native code extension 1.a as a supported platform for which the native code extension is application-bundled.

As such, the widget developer of this example can repackage the first widget, specifying the DVR during the packaging operations. The packaging tool can package the widget, along with any native code or script code that corresponds to the DVR. Other native code or script code in the native code extension, which is intended for other platforms, need not be included in the widget distribution package. In this example, the widget is usable on the DVR because the widget includes the native code used by the widget code to control the display of the television.

Returning now to the installation packages 300 and 350, some installation packages can include both device-bundled native code extensions and application-bundled native code extensions. These installation packages can have multiple extension manifests, one for each native code extension. During the application startup sequence, the loading runtime can identify all native code dependencies declared in the installation package descriptor and compare these dependencies with available device-bundled and application-bundled native code extensions. A loading error may be created if: an extension is bundled with both the device and the application, an extension is bundled with the device more than once, or an extension is indicated as being application-bundled but is not bundled with the application.

The runtime can load the device-bundled native code extensions first, into a first application domain specific to device-bundled native code extensions. The runtime can next load application-bundled native code extensions into a separate application domain specific to application-bundled native code extensions. The device-bundled application domain can be set as a parent to the application-bundled domain, for example so that device-bundled native code extensions can be used to fulfill application-bundled native code extension dependencies. The runtime can next load application code into an application domain. The native code extension domains can be distinct from the domain into which the application itself is loaded.

Figure 4:
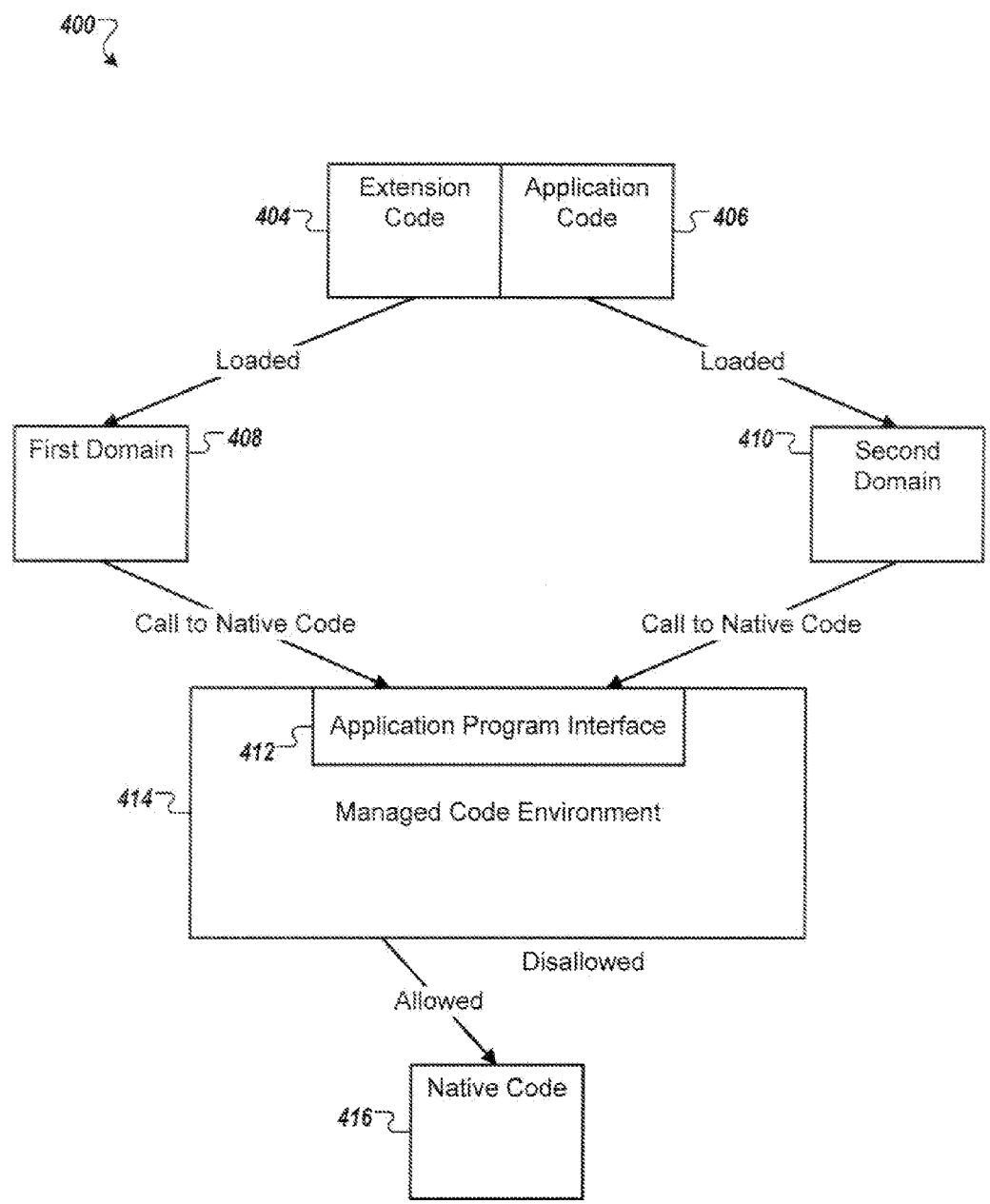
FIG. 4 is a diagram showing an example of a technique to provide safer native calls for native code extensions to an API of a managed code environment.

FIG. 4 shows a technique 400 to provide safer native calls for native code extensions to an API of a managed code environment. In the technique 400, a native code extension is loaded into a first domain that permits calls to native code, and an application is loaded into a separate domain that does not permit calls to native code.

First, a managed code environment is loaded into a supporting platform. Next, the managed code environment 414 can load extension code 404 into a first domain 408. Third, the managed code environment can load application code 406 into a second domain 410. The extension code 404 and the application code 406 need not be related or loaded at the same time. However, if the application code 406 is dependent upon the extension code 404, and the extension code 404 is dependent on the managed code environment 414, this loading order can allow for dependency satisfaction of all loaded objects.

Domains can be virtually addressed spaces that host and execute software components and can prevent or restrict the ability of hosted software components to interact with software components in other domains. Some domains may be hierarchical, such that a software component in a particular domain may be able to access software components in parent or child domains. Some domains may have security or access policies that can restrict the kinds of communications that a hosted software component may perform.

Once loaded, the extension code 404 can extend the API 412 of the managed code environment 414. Once so extended, the API 412 can include function(s) to access native code 416. A call to the native code 416 may include a flag identifying the domain from which the call originated, or the managed code environment 414 may be able to identify the originating domain without a flag in the call itself. Although a part of the API 412, these function(s) can be subject to security policies of the first domain 408, as that is the domain hosting the extension code 404. A call to access the native code 416 through portions of the API 412, which are in first domain 408, can be examined and either permitted or denied. In contrast, a call to access the native code 416 from the application code 406, which is in the second domain 410, can be denied out of hand because of the domain from which the call originates. Thus, if the application code 406 needs to access the native code 416, it does so by making an appropriate call into the extension code 404 in the first domain 408, which can in turn make a call to native code 416 to support the application code 406.

Figure 5:
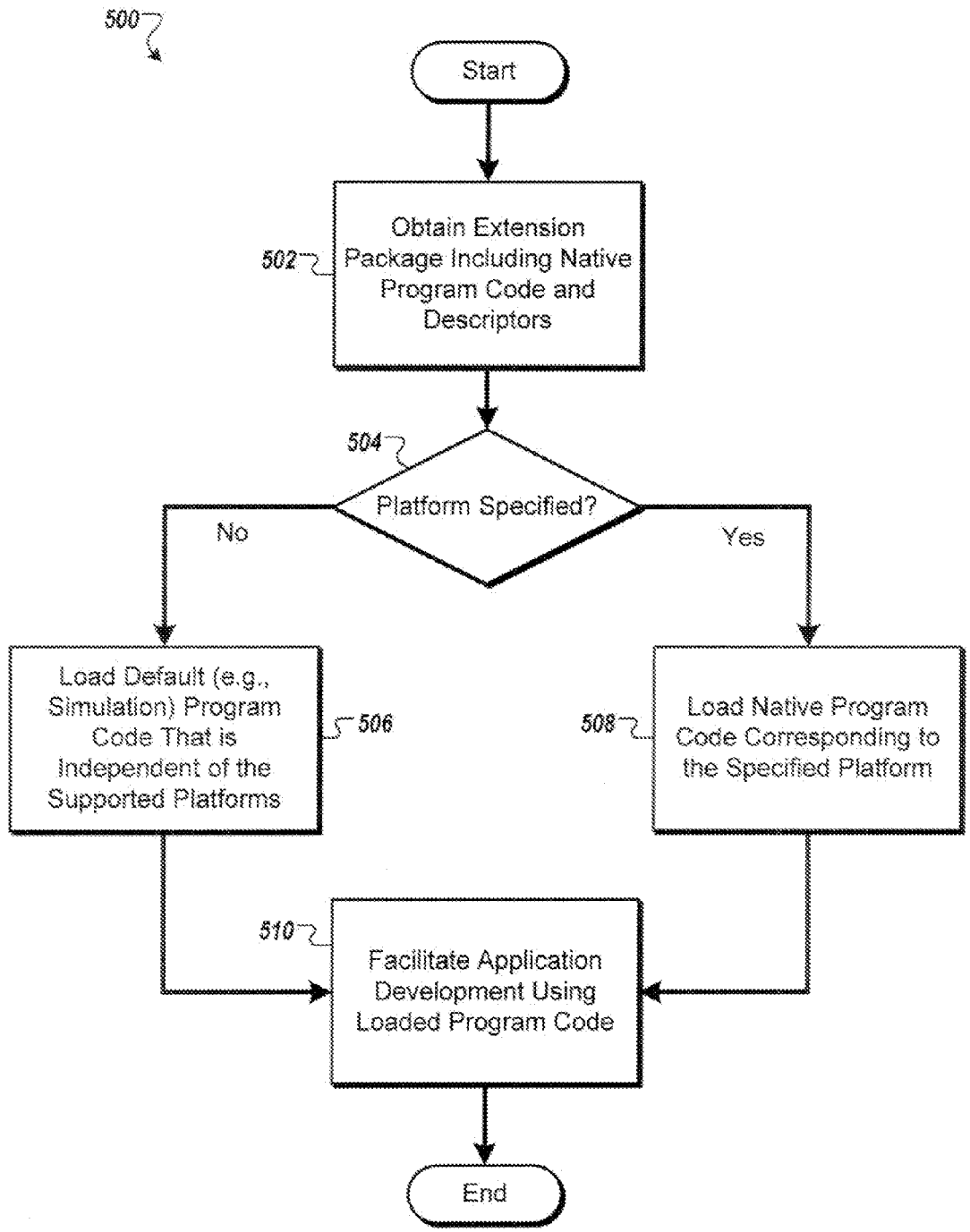
FIG. 5 is a flowchart showing an example of a process to support application development for a cross-platform runtime having an extension.

FIG. 5 is a flowchart showing an example of a process 500 to support application development for a cross-platform runtime having an extension. For example, an application developer or tester can execute a program in a debugging environment. In some implementations, the process 500 may be performed by the system 200 and will be described as such for clarity. Briefly, the process 500 includes loading an extension, and facilitating development of applications with that extension.

An extension package including native program code and descriptors can be obtained 502. For example, the managed code environment 202 can load the native code extension 214 through the predefined library interface 212.

A determination can be made as to whether a platform is specified 504. For example, the desktop development platform 206 can be identified by a text string, and the SDK 204 can examine the extension manifest 224 to determine if the text string of the desktop development platform 206 is included.

If the platform is not specified, default (e.g., simulation) program code that is independent of the supported platforms is loaded 506. For example, the native code extension 214 may include default program code that does not contain any native code and may be executed by the managed code environment 202 regardless of the underlying platform. This code may simulate platform specific native code's behavior in response to application code requests. If the native code 216 does not contain any native code corresponding to the desktop computing platform 206, default program code can be loaded by the SDK 204. In some cases, such as a developer using the extension package to develop an application but not to run or debug the application, the API definitions of the extension package may be loaded, but the code of the extension implementing the API need not be loaded.

If the platform is specified, native program code corresponding to the specified platform is loaded 508. For example, if the native code 216 includes native code corresponding to the desktop computing platform 206 that is hosting the SDK 204, that native code can be loaded by the SDK 204. Alternatively, if the managed code environment 202 and SDK 204 are operating on one of the mobile platforms 210, the appropriate native code corresponding to that mobile platform 210 can be loaded by the SDK 204.

Application development is facilitated 510 using the loaded program code, which can be the appropriate native code or the default code. The SDK 204 can provide access to this code to the development platform (e.g., the desktop computing platform 206) for application development through one or more developer tools for application development, such as integrated development environments, interface builders, and performance analyzers.

Figure 6:
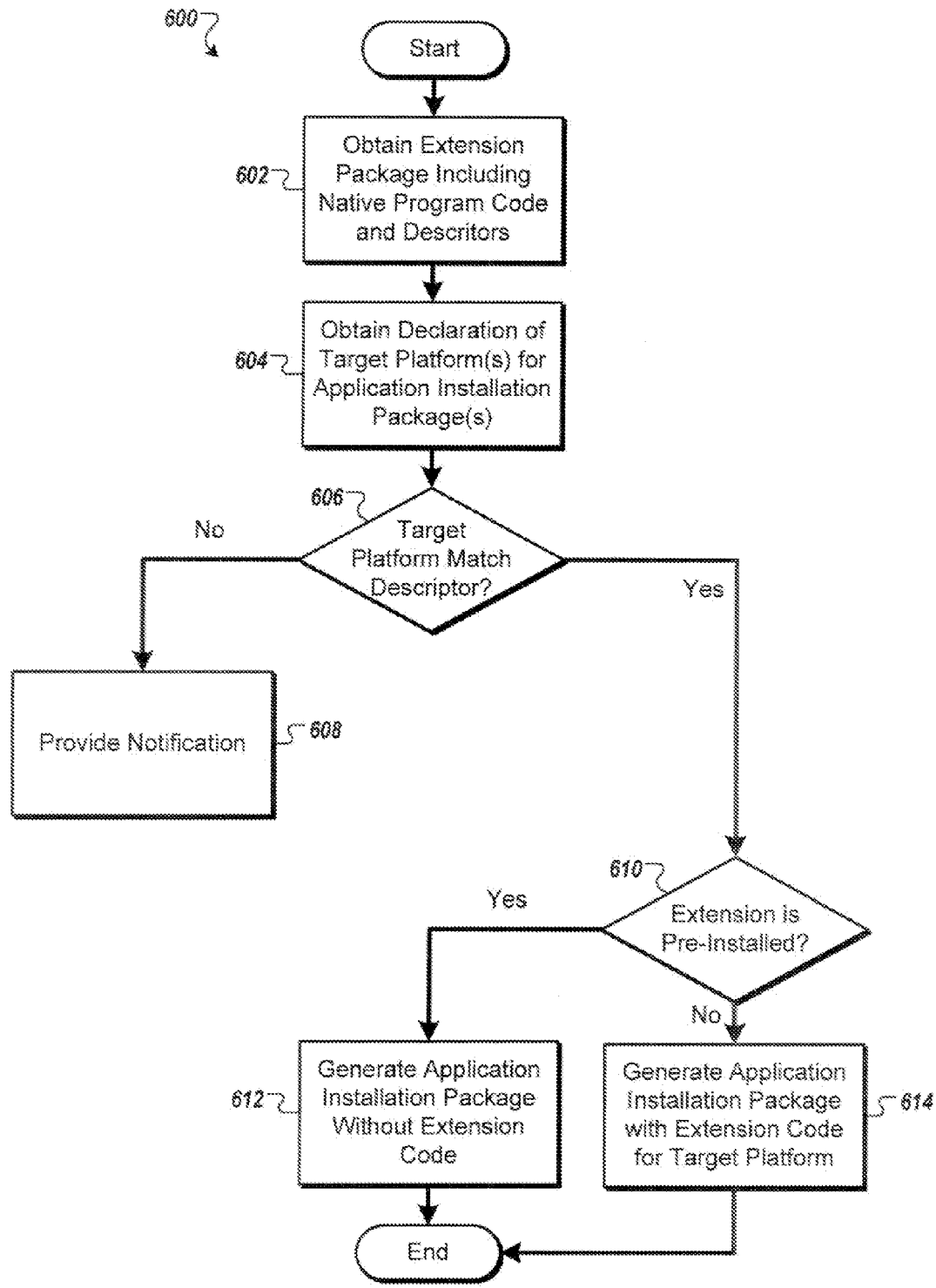
FIG. 6 is a flowchart showing an example of a process to create an installation package for an application developed for a cross-platform runtime having an extension.

FIG. 6 is a flowchart showing an example of a process to create an installation package for an application developed for a cross-platform runtime having an extension. In some implementations, the process 600 may be performed by the system 200 and will be described as such for clarity. Briefly, the process 600 receives a selection of a target platform for an application, and packages the application for deployment to that platform.

An extension package including native program code and descriptors is obtained 602. For example, the SDK 204 can receive the native code 216 and the script code 218. The descriptors can include a list of supported platforms; for example, hardware platforms and operating system combinations that are supported by the extension package.

A declaration of target platform(s) for application installation package(s) can be obtained 604. For example, the SDK 204 can receive instructions from the desktop computing platform 206 to package an application for one or more particular mobile computing platforms 210. The target platforms may be specified according to the same specification scheme as the list of supported platforms in native program code descriptors.

A determination can be made 606 as to whether the target platform matches one of the supported platforms in the native program code descriptor. If no match is found, a notification can be provided 608. For example, an error message can be generated by the SDK 204 for presentation on the desktop computing platform 206.

If a match is found, a determination can be made 610 as to if the extension is pre-installed on the target platform. For example, the native program code descriptors, or other data sources, can indicate if the native code extension 214 is pre-installed on the target platform. If the extension is pre-installed on the target platform, an application installation package without extension code can be generated 612. For example, the SDK 204 can package the application code and the native code descriptors into a distribution package. This distribution package need not include the native code 216 (or in some cases the script code 218), which may have been pre-installed on the target platform.

If the extension is not pre-installed on the target platform, an application installation package with extension code for the target platform can be generated 614. For example, the SDK 204 can package the application code with at least a portion of the native code 216 (and potentially the script code 218). In some implementations, native code 216 can include native code for platforms other than the target platform. In some of these implementations, only the native code 216 for the target platform need be included in the application installation package.

In some examples of the process 600, an extension package can include native programming code for multiple supported platforms, and a declaration of multiple target platforms can be received at 604. In such cases, the check for pre-installation of the extension package can be performed for each of the indicated target platforms, and the appropriate native code portions can be added as needed. Moreover, the process 600 can accommodate multiple, different native code extensions, thereby generating an application installation package with multiple extension manifests, and zero or more native code sections, as needed for the specified target platform(s).

Figure 7:
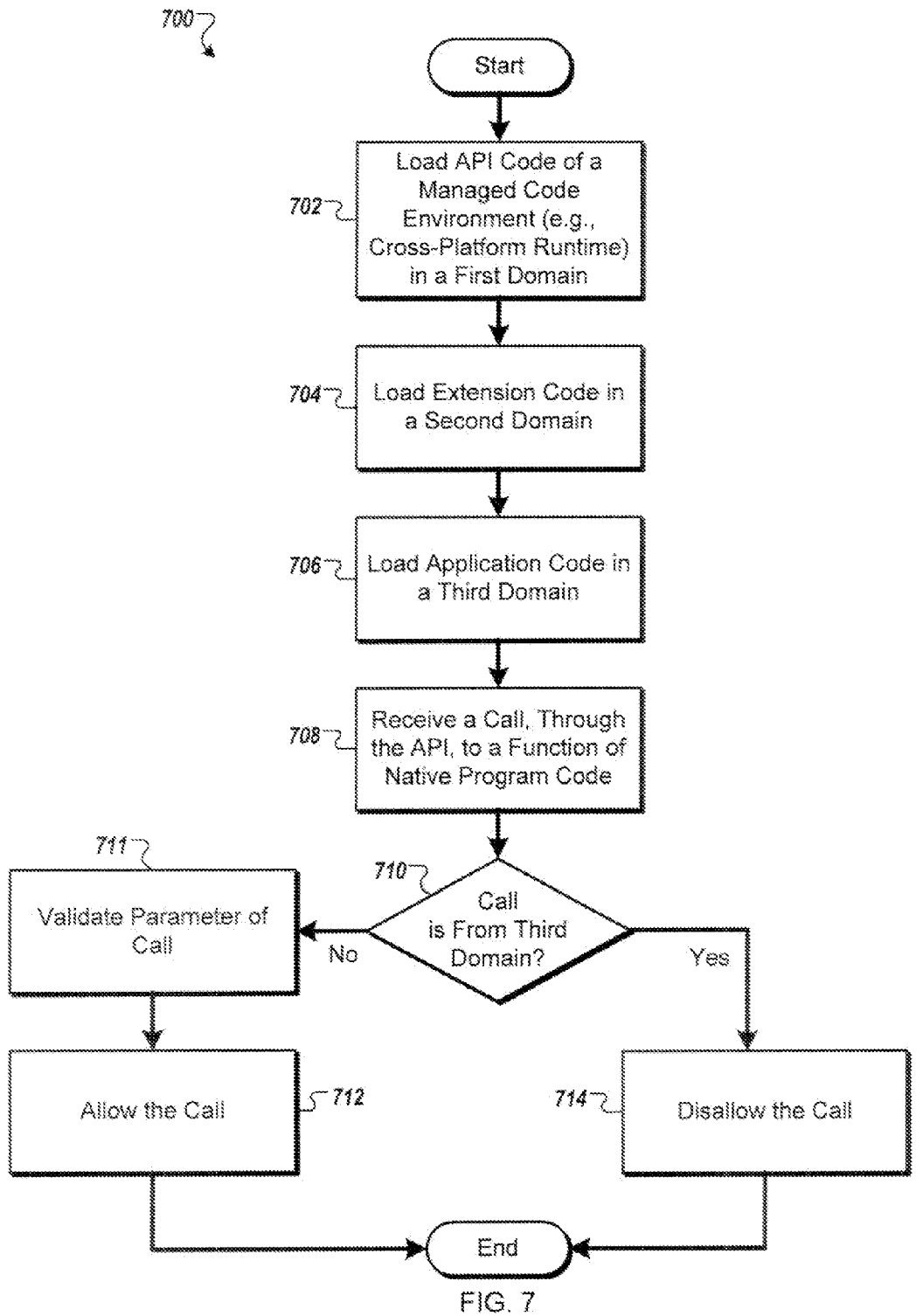
FIG. 7 is a flowchart showing an example of a process to provide safer native calls in a managed code environment that supports native code extensions.

FIG. 7 is a flowchart showing an example of a process to provide safer native calls in a managed code environment that supports native code extensions. In some implementations, the process 700 may be performed by the system represented in FIG. 4 and will be described as such for clarity. Briefly, the process 700 includes loading API code, extension code, and applications code, and permitting or refusing a call to native program code.

API code of a managed code environment (e.g., a cross-platform runtime) is loaded 702 into a first domain. For example, the API 412 can be loaded by the managed code environment 414. The API 412 can provide interfaces to access services of the managed code environment 414, including an interface to access native code 416.

Extension code is loaded 704 into a second domain. For example, the extension code 404 can extend the API 412 with function calls to native code elements. The extended portions of the API 412 can be in the second domain and can be subject to the access policies of the second domain instead of or in addition to the access policies of the first domain. Additionally, any calls made by the extension code may be identified with a flag specifying the second domain.

Application code is loaded 706 into a third domain. For example, any calls made by the application code 406 to the API 412 can be identified with a flag specifying the third domain.

A call is received 708, through the API, to a function of the native program code. For example, the extension code 404 or the application code 406 can call an interface of the API 412 that provides access to native code elements. These interface calls can include a flag specifying the domain from which the call was made.

A determination is made 710 as to whether the call is from the third domain. For example, the managed code environment 414 can examine the flag included in the interface call. If the call is not from the third domain, the parameters of the call can be validated 711. For example, array indexes can be checked, query language parameters can be sanitized to remove special characters, and parameters with values outside of a predefined range can be reset or rejected. Note that such validation can be performed entirely in managed code, either in the extension or in the managed code environment. After validation, the call can be allowed 712. For example, a call from the extension code 404 can include a flag specifying the second domain. As the second domain is not the third domain, the managed code environment 414 can allow the call to proceed to the native code 416. In addition, code of the managed code environment 414 can also make a call to the native code 416, and since this call originates from the first domain, the managed code environment 414 can allow the call to proceed to the native code 416.

If the call is from the third domain, the call can be disallowed 714. For example, a call from the application code 406 can include a flag specifying the third domain. As this flag is identified by the managed code environment as associated with the third domain, the function call can be disallowed. The managed code environment 414 can generate an error to the application code 406 that a call has been disallowed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining, at a computing device, a package of information defining an extension to an application program interface (API) of a runtime, the package of information including native program code configured to expose services of different hardware platforms that are not exposed by the API and descriptors that identify the different hardware platforms supported by the extension;
    obtaining, at the computing device, a declaration of a target hardware platform for an application program that employs the extension;
    comparing, at the computing device, the declaration of the target hardware platform for the application program with the descriptors that identify the different hardware platforms supported by the extension; and
        generating, at the computing device, an installable package for the application program if the target hardware platform is supported by the extension, the installable package configured to enable the application program to access services of the target hardware platform; or
        providing a notification if the target hardware platform is not supported by the extension.

2. The method of claim 1, wherein the obtaining comprises obtaining a declaration of multiple target hardware platforms, and the comparing comprises comparing the declaration of the multiple target hardware platforms with the descriptors that identify the different platforms supported by the extension.

3. The method of claim 1, further comprising:
    determining whether the extension is pre-installed on the target hardware platform; and
    adding, responsive to determining that the extension is not pre-installed on the target hardware platform, a portion of the package of information defining the extension to the installable package for the application program, the added portion comprising native program code corresponding to the target hardware platform.

4. The method of claim 1, wherein the package of information defining the extension includes API definitions corresponding to a scripting engine employed by the runtime and conforms with a program library format employed by a software development kit that does not recognize the native program code.

5. The method of claim 1, wherein the package of information comprises discrete platform directories corresponding to the different hardware platforms supported by the extension, the package of information comprises a default platform directory comprising a version of the extension written in runtime code that is independent of the different hardware platforms supported by the extension, and the method further comprises:
   using the version of the extension written in the runtime code that is independent of the different hardware platforms supported by the extension if the target hardware platform is not specified; or
   using native program code corresponding to the target hardware platform if the target hardware platform is specified.

6. The method of claim 5, wherein the version of the extension written in the runtime code that is independent of the different hardware platforms supported by the extension is a simulation of the extension.

7. One or more non-transitory computer-readable storage devices comprising processor-executable instructions that, responsive to execution by one or more processors, cause the one or more processors to perform operations comprising:
   obtaining, at a first device, a package of information defining an extension to an application program interface (API) of a runtime, the package of information including native program code configured to expose a service of a hardware platform that is not exposed by the API of the runtime and descriptors that identify different hardware platforms supported by the extension;
   obtaining, at the first device, a declaration of a hardware platform of a second device having application program that employs the extension;
   comparing, at the first device, the declaration of the hardware platform of the second device with the descriptors that identify the different hardware platforms supported by the extension; and
   generating, at the first device, an installable package for the application program of the second device if the hardware platform of the second device is supported by the extension, the installable package configrued to enable the application program to access, via the extension, a service of the hardware platform of the second device; or
   providing a notification that the hardware computing platform of the second device is not supported by the extension.

8. The one or more non-transitory computer-readable storage devices of claim 7, wherein the obtaining comprises obtaining a declaration of multiple hardware platforms of multiple respective devices, and the comparing comprises comparing the declaration of the multiple hardware platforms with the descriptors that identify the different hardware platforms supported by the extension.

9. The one or more non-transitory computer-readable storage devices of claim 7, the operations further comprising:
   determining whether the extension is pre-installed on the hardware platform of the second device; and
   adding, responsive to determining that the extension is not pre-installed on the hardware platform of the second device, a portion of the package of information defining the extension to the installable package for the application program of the second device, the added portion comprising native program code corresponding to the hardware platform of the second device.

10. The one or more non-transitory computer-readable storage devices of claim 7, wherein the package of information defining the extension includes API definitions corresponding to a scripting engine employed by the runtime and conforms with a program library format employed by a software development kit that does not recognize the native program code.

11. The non-transitory one or more computer-readable storage devices of claim 7, wherein the package of information comprises discrete platform directories corresponding to the different hardware platforms supported by the extension, the package of information comprises a default platform directory comprising a version of the extension written in runtime code that is independent of the different hardware platforms supported by the extension, and the operations further comprise:
   using the version of the extension written in the runtime code that is independent of the different hardware platforms supported by the extension if the hardware platform of the second device is not specified; or
   using native program code corresponding to the hardware platform of the second device if the hardware platform of the second device is specified.

12. The one or more non-transitory computer-readable storage devices of claim 11, wherein the version of the extension written in the runtime code that is independent of the different hardware platforms supported by the extension is a simulation of the extension.

13. A system comprising:
   one or more processors; and
   a memory coupled to the one or more processors and including instructions that are executable to implement a cross-platform managed code environment to:
      obtain a package of information defining an extension to an application program interface (API) of a runtime, the package of information including native program code configured to expose services of a hardware platform that are not exposed by the API and descriptors that identify different hardware platforms supported by the extension; and
      use a version of the extension written in runtime code that is independent of the different hardware platforms supported by the extension if a hardware platform is not specified; or use native program code corresponding to the hardware platform if the hardware platform is specified, wherein the cross-platform managed code environment is further implemented to: obtain a declaration of a target hardware platform of a device that implements an application program that employs the extension; compare the declaration of the target hardware platform of the device with the descriptors that identify the different hardware platforms supported by the extension; and generate an installable package for the device if the target hardware platform is supported by the extension, the installable package configured to enable the application program to access a service of the target hardware platform of the device; or provide a notification if the target hardware platform of the device is not supported by the extension.

14. The system of claim 13, wherein the version of the extension written in the runtime code that is independent of the different hardware platforms supported by the extension is a simulation of the extension that is implemented in the cross-platform managed code environment.

15. The system of claim 13, wherein the cross-platform managed code environment is further implemented to:
- obtain a declaration of a target hardware platform of the device that implements an application program that employs the extension;
- compare the declaration of the target hardware platform of the device with the descriptors that identify the different hardware platforms supported by the extension; and
- generate an installable package for the device if the target hardware platform is supported by the extension, the installable package configured to enable the application program to access a service of the target hardware platform of the device; or
- provide a notification if the target hardware platform of the device is not supported by the extension.

16. The system of claim 13, wherein the cross-platform managed code environment is further implemented to:
- obtain a declaration of a target hardware platform of a device that implements an application program that employs the extension;
- determine whether the extension is pre-installed on the target hardware platform of the device; and
- generate an installable package for the application program without a corresponding portion of native code if the extension is pre-installed on the target hardware platform of the device; or
- generate an installable package for the application program with a corresponding portion of native code if the extension is not pre-installed on the target hardware platform of the device.

17. The system of claim 16, wherein the cross-platform managed code environment is further implemented to generate the installable package for the application program with the corresponding portion of native code by adding a platform directory from the package of information defining the extension to the installable package for the application program in a relative location in the installable package for the application program that matches a relative location of the platform directory in the package of information defining the extension.

18. The system of claim 13, wherein the package of information defining the extension includes API definitions corresponding to a scripting engine employed by the runtime and conforms with a program library format employed by a software development kit that does not recognize the native program code.

19. The system of claim 13, wherein the package of information comprises discrete hardware platform directories corresponding to the different hardware platforms supported by the extension.

20. The system of claim 19, wherein the discrete hardware platform directories corresponding to the different hardware platforms supported by the extension include different hardware platform directories for each instruction set architecture (ISA) of the different hardware platforms.

21. The system of claim 20, wherein each of the different hardware platforms comprises a different set of hardware components that are accessed or controlled through a corresponding ISA.

22. The system of claim 21, wherein the set of hardware components comprises a network adapter, video adapter, or processor.

* * * * *

UNITED STATES PATENT AND TRADEMARK OFFICE
CERTIFICATE OF CORRECTION

| | | |
|---|---|---|
| PATENT NO. | : 8,694,988 B2 | Page 1 of 1 |
| APPLICATION NO. | : 12/910773 | |
| DATED | : April 8, 2014 | |
| INVENTOR(S) | : Oliver Goldman | |

It is certified that error appears in the above-identified patent and that said Letters Patent is hereby corrected as shown below:

In the Claims:

Column 21, Line 37, after "...device having" before "application" insert -- an --, therefor.

Column 21, Line 46, after "...installable package" delete "configrued" and insert -- configured --, therefor.

Signed and Sealed this
Fifteenth Day of July, 2014

Michelle K. Lee
*Deputy Director of the United States Patent and Trademark Office*